April 27, 1948.　　　　G. R. ELLIOTT　　　　2,440,654
HYDRAULIC PRESSURE INTENSIFIER UNIT
Filed Oct. 28, 1943　　　3 Sheets-Sheet 1

INVENTOR.
GORDON R. ELLIOTT.
BY
Robert A. Sloman
ATTORNEY.

April 27, 1948.  G. R. ELLIOTT  2,440,654
HYDRAULIC PRESSURE INTENSIFIER UNIT
Filed Oct. 28, 1943  3 Sheets-Sheet 2

INVENTOR.
GORDON R. ELLIOTT.
BY Robert A. Sloman
ATTORNEY.

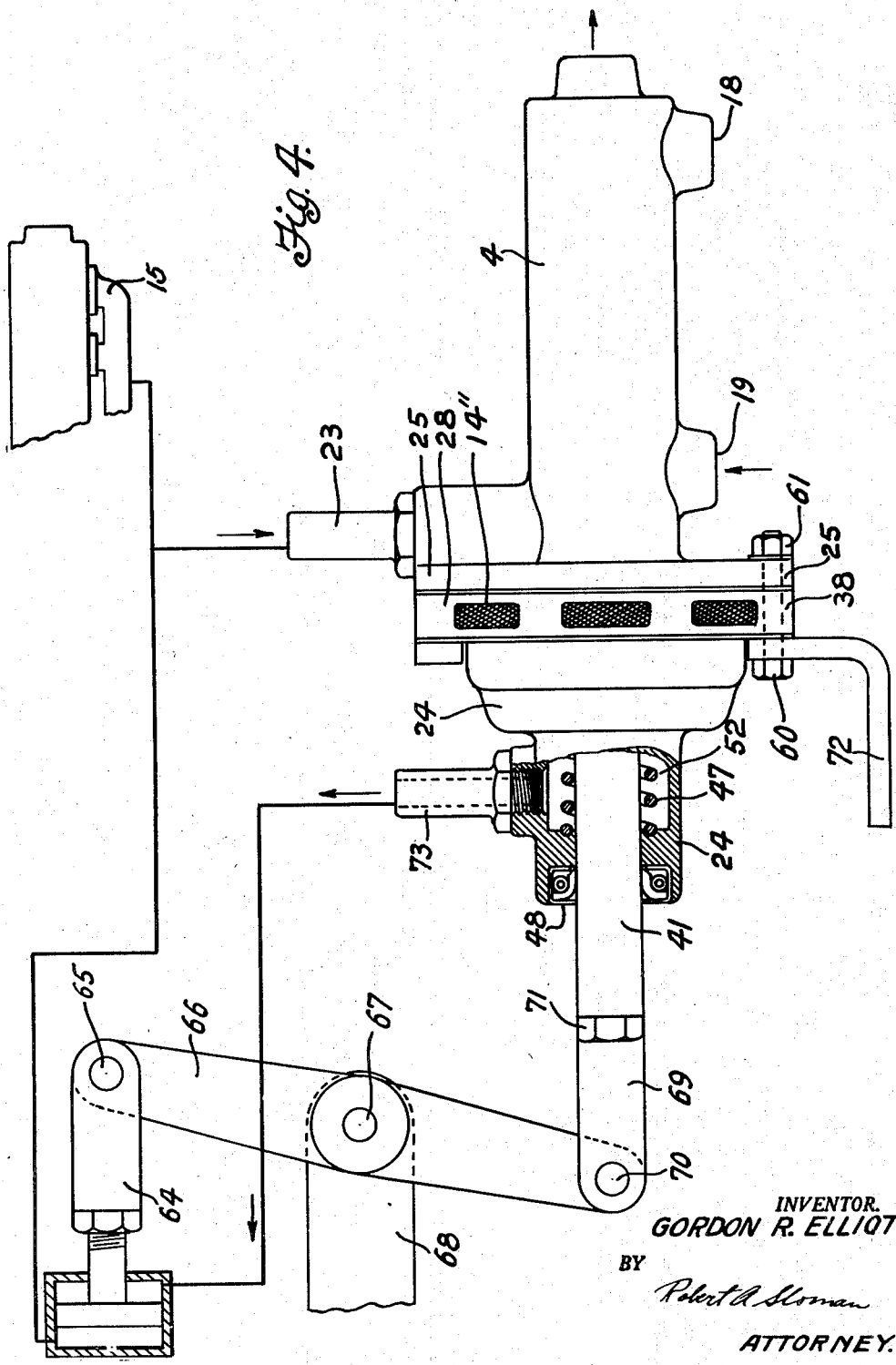

Patented Apr. 27, 1948

2,440,654

UNITED STATES PATENT OFFICE 2,440,654

HYDRAULIC PRESSURE INTENSIFIER UNIT

Gordon R. Elliott, Ferndale, Mich., assignor, by mesne assignments, to Irving A. Puchner and Edward U. Demmer, Milwaukee, Wis.

Application October 28, 1943, Serial No. 508,033

13 Claims. (Cl. 60—54.5)

This invention relates to a hydraulic unit for the actuation of vehicle or truck brakes. More particularly the invention relates to the combination with the hydraulic master cylinder manually operable brakes, of a power unit for effecting a secondary power brake operation, as shown similarly in copending application Ser. No. 573,997, filed Jan. 22, 1945.

It is the object of this invention to provide in conjunction with the conventional hydraulic master fluid cylinder governing vehicle braking, a secondary power braking mechanism including a diaphragm actuating power chamber, a hydraulic cylinder, and a vacuum air controlling valve.

It is the object of this invention to provide a secondary power brake mechanism characterized by a manifold vacuum suspended power chamber actuated diaphragm, together with means for disconnecting vacuum to one of the sides thereof and admitting air thereto for actuation and translation thereof.

It is the further object herein to provision a brake operating hydraulic cylinder for supplying to the vehicle brakes initially manually operable master cylinder brake fluid under pressure, and secondary power actuated fluid under pressure.

It is the further object of this invention to provide in conjunction with the conventional manual master cylinder vehicle brakes, a secondary power brake mechanism characterized by a power chamber with a vacuum suspended piston therein, an air and vacuum control valve, and reciprocable power transmitting means interconnecting said piston and the fluid piston within the hydraulic brake operating cylinder.

It is the object herein to provide the combination with the hydraulic cylinder vehicle brake actuating mechanism, of vacuum suspended power brake means remote from said hydraulic cylinder with the remote power transmitting means suitably interconnected therebetween.

The invention relates to the various arrangement of elements and their combinations as more fully set out in connection with the appended drawings of which—

Fig. 4 is a partially broken away elevational view of the hydraulic brake cylinder and a slightly different type of power brake unit connection.

The above drawings are merely illustrations of preferable embodiments of the present invention, it being understood that other embodiments are contemplated within the scope of this invention as set out in the appended claims.

Figure 1:
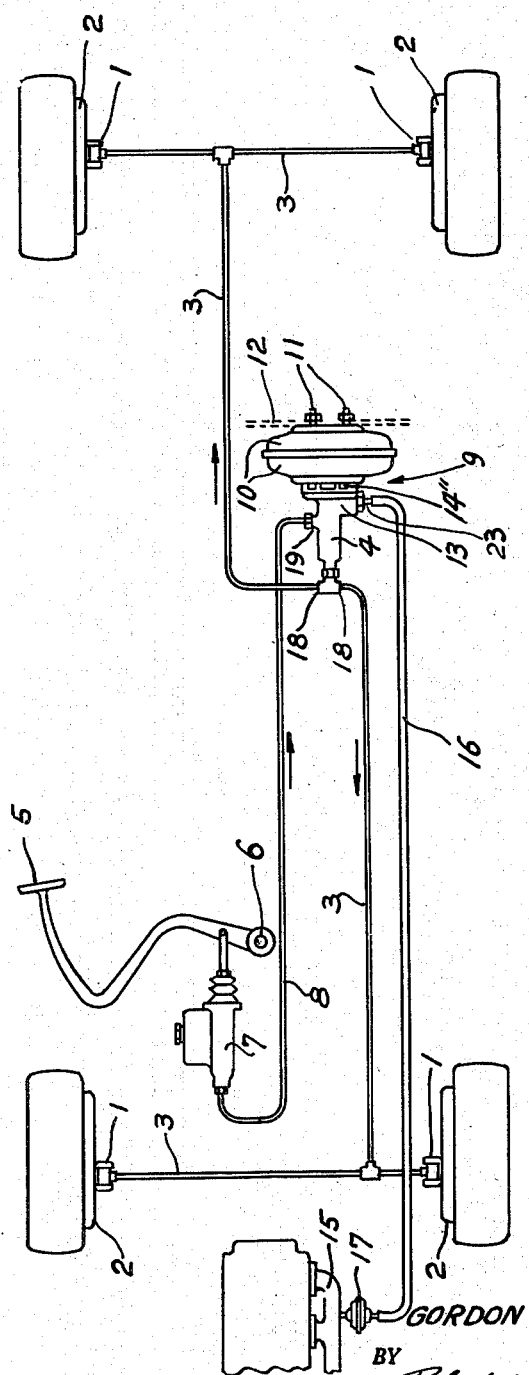
Fig. 1 is a diagrammatic view showing the hydraulic vehicle brake actuating cylinder, the manual master cylinder brake mechanism, and the supplementary power brake unit joined thereto.

In Fig. 1 suitable hydraulic wheel cylinders 1 are provisioned adjacent the vehicle wheel brakes 2 with hydraulic connections thereto being supplied through conduits 3 from the hydraulic cylinder 4.

Brake foot pedal 5 pivoted at 6 is adapted to actuate the piston within the master hydraulic cylinder 7 for supplying fluid therein under pressure to said hydraulic cylinder 4, through conduit 8 for normal manual brake application.

The hydraulic power unit 9 with power chamber 10 is carried by bolts 11 secured to the vehicle frame 12 or suitable bracket secured thereto. The vacuum hydraulic valve housing 13 with air inlets 14" is joined to vehicle intake vacuum manifold 15 by conduit 16 and manifold check valve 17 for supplying vacuum to power chamber 10 as hereunder explained.

Figure 2:
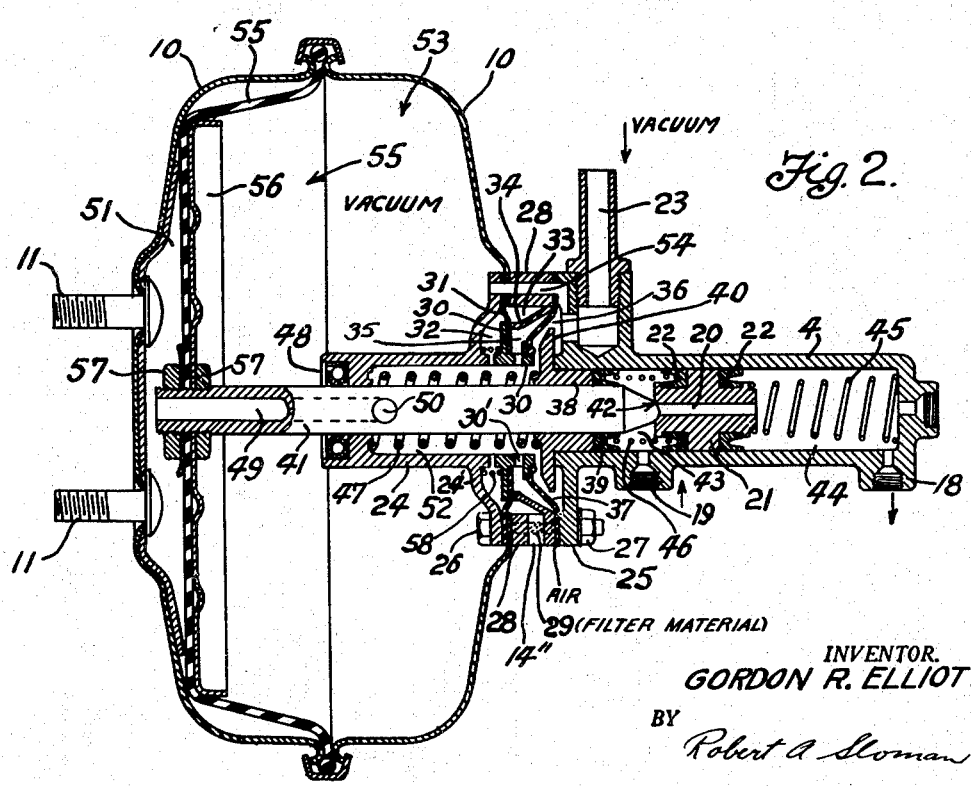
Fig. 2 is an enlarged elevational section of the hydraulic brake cylinder and power brake unit.

Referring to Fig. 2 the vehicle brake hydraulic cylinder 4 has an outlet port 18 for communication with hydraulic brake lines 3 shown in Fig. 1. While one such port is shown in Fig. 2, Fig. 1 shows two such outlet ports 18 for communication with conduits 3.

Intake port 19 connects with conduit 8 from the hydraulic master cylinder 7 whereby manually operated brake fluid is supplied under pressure to hydraulic cylinder 4 to be directed through the longitudinal opening 20 within piston 21 slidingly provisioned in cylinder 4. Piston expansion cups 22 carried by piston 21 at opposite ends thereof provide an effective hydraulic seal within cylinder 4.

Hydraulic cylinder 4 is provisioned at one end with a vacuum inlet connection 23 adapted for connection to vacuum conduit 16 from the vehicle intake manifold 15 in the manner illustrated in Fig. 1.

The vacuum valve body housing 24 extending within power chamber housing 10 is suitably secured to the annular flange 25 of cylinder housing 4 by bolts 26 and nuts 27, with the air filter spacer 28 interposed therebetween. Said filter spacer 28 is transversely slotted for housing air filters 29 through which air is conducted from air inlet 14".

It will be noted that power chamber 10 is retained between valve housing 24 and filter spacer 28; and further that diaphragm plate 30 is provisioned within housing 24 and filter spacer 28.

Hollow diaphragm 31 retained at its outer peripheral edge between power chamber 10 and valve housing 24 is centrally secured to the annularly flanged portion of plate 30 and movable therewith. Thus chambers 32 and 33 are provided upon opposite sides thereof, with chamber 32 bounded by diaphragm 31 and housing 24, and with chamber 33 bounded by said diaphragm and the annular flanged member 34 forming a part of filter spacer 28 and projecting angularly inwardly with respect thereto.

Chambers 35 and 36 are also provided on opposite sides of the hollow secondary diaphragm 37 which is peripherally retained between filter spacer 28 and cylinder housing 4 and centrally retained by diaphragm plate 30. Diaphragm plate 30 is of the spool type construction, one end of which being secured to diaphragm 31 and the other end to diaphragm 37. Central radial openings 30' are provided in plate 30 between said diaphragms providing connection between chamber 35 and chamber 52.

Hollow secondary piston 38 with suitable piston cup 39 is reciprocably movable within cylinder housing 4 with its annular flanged portion 40 projecting within chamber 36 above described.

Hollow housing 24 with chambered recess 52, has longitudinally and reciprocably provisioned therein plunger 41 which projects through housing 24 and into power chamber 10 at one end, with its other end being slidably disposed through hollow piston 38, but with its rounded end portion 42 adapted to operatively register with opening 20 in piston 21 for closing off the same from chamber 43. The end portion 42 of plunger 41 is also adapted to operatively engage piston 21 for causing longitudinal translation thereof for exerting pressure upon the brake fluid contained within chamber 44 in power cylinder 4.

It will be noted that a return spring 45 is provisioned within chamber 44 of cylinder 4 between the outer end thereof and the reciprocable piston 21. Also an expansion spring 46 is interposed between piston 21 and piston 38 for maintaining a variable spaced relation therebetween, and also for holding seal 39 in position relative to piston 38. Also another return spring 47 is provisioned within valve housing 24 interposed between one end thereof and the end of piston 38. It will be noted that a suitable pneumatic seal 48 is provisioned around plunger 41 and within the end of housing 24 for maintaining a suitable seal between the plunger 41 and said housing.

Plunger 41 has a central longitudinal opening 49 in one end thereof which terminates in transverse opening 50 within plunger 41 providing pneumatic communication between chamber 51 within power chamber 10 and chamber 52 within valve housing 24.

It is seen in Fig. 2 that chamber 52 is adapted for communication with chambers 32, 35 and 36; and also with chamber 33 when diaphragm plate 30 is moved to the left relative to the annular flange 34 on spacer 28. It is further seen that vacuum communication to inlet connection 23 is established to chamber 36; and also to chamber 53 through conduit 54 formed within housing members 4 and 24 and filter spacer 28.

Flexible cup shaped diaphragm 55 peripherally retained by and between the two opposed power chamber housing members 10 is adapted to flexing movement within chambers 51 and 53 on opposite sides thereof within power chamber 10.

Diaphragm plate 56 substantially circular in shape, registering with the central inner surface of diaphragm 55, is provisioned upon the end of the reciprocable plunger 41 and secured thereon by the nuts 57 threaded upon opposite sides thereof on plunger 41. Consequently longitudinal movement of diaphragm 55 within power chamber 10, upon the establishment of a pressure differential between chambers 53 and 51, will cause a corresponding longitudinal forceful movement of plunger 41 within valve housing 24 and cylinder 4.

Operation

In operation, manual application of the vehicle foot pedal 5 shown in Fig. 1, joining the master hydraulic cylinder 7 will supply brake fluid under pressure through conduit 8 and port 19 to the hydraulic cylinder 4. Fluid under pressure thus enters chamber 43 between pistons 21 and 38 and is retained therein until sufficient pressure is developed to cause partial longitudinal movement of piston 21 to the right relative to plunger 41 and against spring 45, uncovering channel 20 therein.

Fluid under pressure thus enters chamber 44 and is directed out port 18 and through conduits 3 for initial normal vehicle brake application. Before brake application vacuum communication from the engine manifold 15, Fig. 1, has been established within chamber 53 through conduit 16, connection 23 and conduit 54. Likewise vacuum communication in chamber 51 was also obtained from connection 23, chamber 36, chamber 52, opening 50 and conduit 49, whereby an equilibrium is established between chambers 51 and 53. Furthermore vacuum communication is established with chambers 32 and 35 normally in communication with chamber 52.

The initial manually controlled fluid under pressure in chamber 43 also causes movement to the left of piston 38 within cylinder housing 4 and with respect to plunger 41. Piston or vacuum valve 38 engages diaphragm or vacuum valve seat 37 and its retaining plate 30 closing off further vacuum communication between chambers 36 and 52, and consequently from diaphragm chamber 51 within power chamber housing 10.

Further movement to the left of piston 38 causes further translation to the left of diaphragm supporting plate 30 and the diaphragm 31 also joined thereto. This movement establishes communication between chambers 33 and 35 supplying air from air inlet 14" into valve chamber 52, whence it rapidly enters chamber 51 through opening 50 and conduit 49 in valve plunger 41.

This secondary movement of diaphragm plate 30 against the action of coiled spring 58 and up to the annular boss 24' in housing 24 is facilitated by the pressure differential between chambers 32 and 35, with vacuum initially in chamber 32 and with air now in chamber 35. Thus boss 24' definitely limits the movement to the left of piston 38.

At this point a very substantial pressure differential has been effected between chambers 53 and 51, inasmuch as chamber 53 is in constant communication with the vacuum source, while air communication has been established with chamber 51. Consequently diaphragm 55, plate 56 and plunger 41 are forcefully projected to the right, opposite to the direction of movement of piston 38.

The end portion 42 of plunger 41 closing off conduit 20 in piston 21 operatively engages the end of said piston causing longitudinal movement to the right thereof greatly increasing the fluid pressure within chamber 44 which is directed out through port 18 and through conduits 3 to the vehicle brakes. In this manner supplemental power braking of the vehicle is effected.

Movement of piston 21 to the right increasing the volume of chamber 43, necessarily reduces the existing fluid pressure therein, with the result that piston 38 can now, under action of return spring 47, return to the right holding the valve in balance; that is, holding vacuum valve 37 closed and closing air valve 31 for partial or controlled braking; or on further movement of piston 38 on brake release again establishing vacuum communication between chambers 36 and 52 and between chamber 52 and chamber 35, also permitting vacuum to be built up again within chamber 51. It will be understood as an equilibrium is again established between chambers 51 and 53 that plunger 41 and diaphragm 55 joined thereto will return to the left to its initial position for terminating or releasing the power brake action.

With vacuum in chamber 36 and air in chamber 35 the pressure differential on vacuum valve diaphragm 37 facilitates longitudinal movement of diaphragm plate 30 to the right. Air valve diaphragm 31 also moving with diaphragm plate 30 engages air valve seat 34 i. e. the annular flange 34 forming a part of member 28 thus closing off further air communication between chambers 33 and 35.

Flange 34 on spacer 28 also stops movement of plate 30 to the right thus preventing diaphragm 37 from following piston 38 thus braking valve sealing between valve 38 and diaphragm seat 37, and permitting vacuum from chamber 36 to enter chamber 32. This movement to the right of diaphragm supporting plate 30 is facilitated by the action of the initially compressed spring 58. The above pressure differential in chambers 35 and 36 on diaphragm 37 also reacts upon piston 38 in a variable degree in addition to the more or less steady or non-variable pressure exerted by spring 47. This pressure differential will be in proportion to the pressure differential on diaphragm 55 in chambers 51 and 53.

Thus a resistance pressure is created in chamber 43 against the manually created pressure from the master cylinder conduit 8, which is transferred to foot pedal 5 in proportion to the amount of braking pressure exerted by diaphragm 55, thus establishing a relationship between amount of braking and "pedal feel."

Piston 38 is now in its initial position as shown in Fig. 2, and with plunger 41 returned to its initial position, piston 21 under action of coiled spring 44 is also permitted to return to its initial brake release position. It is noted that the outer portion of piston flange 40 provides reinforcement for the flexing movement of the vacuum valve diaphragm 37.

The above construction particularly specified in Figs. 1 and 2 provides effective power braking to supplement the normal vehicle manually operated hydraulic brakes. Said structure provides for an air operated diaphragm within a power chamber for obtaining a power stroke upon the piston within the brake operating hydraulic cylinder.

It is seen that the power stroke is effected by longitudinal movement of plunger 41 operatively and directly engaging the coaxial piston 21 within the hydraulic brake operating cylinder. The particular construction shown is compact in its arrangement inasmuch as the power plunger 41 slidably operates within and through the air and vacuum control valve housing.

It is further to be noted that the vacuum valve operating control piston is reciprocably movable within said control valve housing and also within the hydraulic brake cylinder. Furthermore power plunger 41 is centrally and slidably disposed through control piston 38, with its movement being entirely independent of the movement of said control piston. In fact on power brake application, movements of the plunger and the valve piston are in opposite directions.

Figure 3:
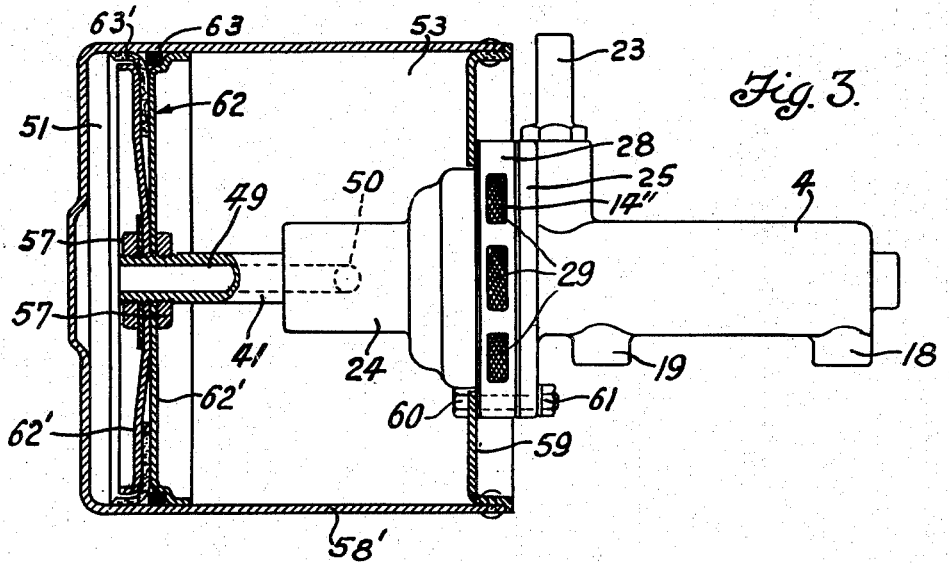
Fig. 3 is a partially sectioned elevational view of the hydraulic brake cylinder and a slightly different type of hydraulic power brake unit.

Fig. 3 is similar to Fig. 2 with respect to the brake operating hydraulic cylinder 4 as well as the air and vacuum control valve 24 and the operative power brake piston operating plunger 41. The difference however resides in the power chamber construction employing a cylinder and a movable piston therein joined to the plunger for operating the same.

Said power chamber consists of a closed hollow cylindrical member 58' with the end concaved wall portion 59 being secured to the air and vacuum control valve housing 24, filter spacer 28, and hydraulic brake control cylinder housing flange 25 by means of bolts 60 and nuts 61.

It is noted that air openings 14" in filter spacer 28 are nested within the concaved portion of end wall 59 of power cylinder 58'.

Reciprocable piston 62 formed by plates 62' provisioned within cylinder 58' with a suitable oil wick 63 is centrally secured to plunger 41 by the two nuts 57 threaded thereon upon opposite sides of said piston construction. The sealing ring 63' for piston 62 is retained within cylinder 58' by the two plates 62' forming piston 62.

Similarly as in Fig. 2 the two chambers 51 and 53 are established, with the pressure differential obtained therebetween during brake application being exactly the same as obtained with respect to corresponding chambers 51 and 53 in power chamber 10 shown in Fig. 2.

Instead of a diaphragm within a power chamber, merely a piston construction 62 is employed, reciprocably movable within cylinder 58' for effecting forceful translation of power brake operating plunger 41.

A similar construction is shown in Fig. 4 employing the same brake operating hydraulic cylinder 4 with outlet port 18 and manual fluid control inlet port 19 for connection with the master cylinder 7 in the manner illustrated in Fig. 1. The vacuum and air control valve housing 24 is the same with the plunger 41 reciprocably provisioned therethrough.

However it is contemplated that the power chamber of either type shown in Fig. 2 or 3 can be remote from the control valve 24 and hydraulic cylinder 4. Connecting rod 64 is adapted for connection to the movable member within the particular power chamber employed, though not shown herein, said movable member being either the diaphragm 55 shown in Fig. 2 or the piston 62 as shown in Fig. 3.

Connecting rod 64 is pivotally joined at its end 65 to lever 66 centrally pivoted at 67 to bracket 68 or other member forming a part of the vehicle or truck frame. A secondary connecting rod 69 is pivotally jointed at 70 to the other end of lever 66 and is secured to the reciprocable plunger 41 at point 71.

As in Figs. 2 and 3, valve housing 24 is secured by bolts 60 and nuts 61 to filter spacer 28 and hydraulic cylinder flange 25; however a suitable bracket 72 is also retained by one of the bolts 60 for attachment to the vehicle.

Chamber 52 within valve housing 24 is provided connection to one side of either the diaphragm or piston employed within the remote power chamber by means of the outlet port or connection 73. It will be noted as above described that the air source to outlet 73 is through valve housing 24 and chamber 52 therein from the air inlet openings 14" in filter spacer 28.

The vacuum communication or connection to chamber 52 and outlet 73 in control valve 24 is also from inlet port 23 which is joined to the vehicle manifold 15 by conduit 16 as shown in Fig. 1.

Thus by operation of the air and vacuum control valve 24 either air or vacuum is directed to the corresponding chamber 51 on one side or the piston or diaphragm within the remote power chamber. On the other hand the corresponding chamber 53 in said remote power chamber is provided with a continuous vacuum supply from the vehicle manifold for effecting operation of the movable plunger 41 for operating power braking in the manner above fully described with respect to Figs. 2 and 3.

Having described my invention reference should now be had to the claims which follow for determining the scope thereof.

I claim:

1. A power unit comprising a hydraulic cylinder containing fluid to be supplied under varying pressures to the wheel brake cylinders of a vehicle, a piston in said cylinder operable on said fluid, a manually operable pressure fluid source communicating with said fluid, a power chamber, a movable member therein adapted to translation and to operatively engage said piston upon a pressure differential on opposite sides of said movable member, an air and vacuum control valve co-axial with and intermediate said cylinder and power chamber for effecting said differential, and a secondary piston in said hydraulic cylinder in spaced relation to said first piston engageable with said valve for controlling the same and operable upon by said manually operable pressure fluid source.

2. The combination, a hydraulic cylinder, valve control and fluid control pistons oppositely disposed therein providing a fluid chamber therebetween, there being a secondary fluid chamber in said cylinder for delivering fluid under pressure, a manually controlled pressure fluid source joining said first chamber, adapted for communication with said secondary chamber through said fluid control piston, and for operative pressure engagement with said valve control piston for effecting movement thereof, a power chamber, a movable member therein adapted to forceful translation, means carried by said movable member extending through said valve control piston to operatively engage said fluid control piston upon a pressure differential on opposite sides of said movable member, and an air and vacuum control valve intermediate said cylinder and power chamber engageable by said valve control piston for effecting said differential.

3. The combination, a hydraulic cylinder, an air and vacuum valve control piston and a brake fluid control piston in said cylinder, a manually controlled pressure fluid source connected to the cylinder intermediate said pistons adapted for communication through said fluid control piston and for operative pressure engagement with said valve control piston, a power chamber, a movable member therein adapted for forceful translation, means carried by said movable member extending through said valve control piston, to operatively engage said fluid control piston upon a pressure differential on opposite sides of said movable member, and an air and vacuum control valve intermediate said cylinder and power chamber engageable by said valve control piston for effecting said differential.

4. The combination, a hydraulic cylinder, air and vacuum valve control and brake fluid control pistons therein, a manually controlled pressure fluid source connected to the cylinder intermediate said pistons adapted for communication through said fluid control piston and for operative pressure engagement with said valve control piston, a power chamber, a movable member therein adapted for forceful translation, means carried by said member extending through said valve control piston, to operatively engage said fluid control piston upon a pressure differential on opposite sides of said movable member, a vacuum source joining said power chamber on one side of said movable member, and an air and vacuum control valve intermediate said cylinder and power chamber for normally maintaining vacuum communication to the other side of said movable member, but adapted on movement of said valve control piston engaging the same for cutting off said latter vacuum communication and establishing air communication thereto.

5. The combination, a hydraulic cylinder, a power chamber containing a movable diaphragm centrally therein defining a vacuum chamber and an operating chamber on opposite sides thereof, an air and vacuum control valve intermediate and co-axial with said cylinder and power chamber adapted to alternately provide air and vacuum communiction to said operating chamber, a vacuum source communicating with said vacuum chamber, a valve operating piston adapted to engage said valve and a brake fluid control piston in said cylinder, a manually controlled pressure fluid source connected to the cylinder intermediate said pistons adapted for communication through said fluid control piston and for pressure engagement with said valve operating piston, and a plunger rod slidably provisioned through said valve and valve operating piston joined to said movable member and adapted to forcefully engage said fluid control piston.

6. The combination, a hydraulic cylinder, a power chamber containing a movable diaphragm therein defining a vacuum chamber and an operating chamber on opposite sides thereof, an air and vacuum control valve housing intermediate and co-axial with said cylinder and power chamber, a hollow movable member therein, a pair of diaphragms peripherally secured to said housing in spaced relation, and centrally carried by said movable member adapted to alternately provide vacuum and air communication through said housing to said operating chamber, a vacuum source communicating with said vacuum chamber, a valve operating piston adapted to operatively engage said movable valve member, and a fluid control piston both in said cylinder, a manually controlled pressure fluid source connected to the cylinder intermediate said pistons adapted for communication through said fluid control piston and for pressure engagement with said valve operating piston, and a plunger rod slidably provisioned through said housing, movable valve member, and valve piston, joined to said power chamber diaphragm and adapted to forcefully engage said fluid control piston.

7. The combination, a hydraulic cylinder, a fluid control piston having an opening therethrough and a valve control piston in said cylinder in spaced relation, a manually operable pressure fluid source connected to the cylinder between said pistons adapted for communication through said piston opening, and for operative pressure engagement with the other piston, a power chamber, a movable member therein adapted to translation upon a pressure differential on opposite sides thereof, a longitudinally movable plunger rod joining said movable member, slidably disposed through said valve control piston for operative engagement with said fluid control piston, and normally closing the opening therein, and an air and vacuum control valve co-axial with and intermediate said cylinder and power chamber engageable by said valve control piston for effecting said differential.

8. The combination, a hydraulic cylinder, a fluid control piston having an opening therethrough and a valve control piston in said cylinder in spaced relation, resilient means intermediate said pistons, and resilient means intermediate said pistons and the ends of said cylinder, a manually operable pressure fluid source connected to the cylinder between said pistons adapted for communication through said piston opening, and for operative pressure engagement with the other piston, a power chamber, a movable member therein adapted to translation upon a pressure differential on opposite sides thereof, a longitudinally movable plunger rod joining said movable member, slidably disposed through said valve control piston for operative engagement with said fluid control piston, and normally closing the opening therein, and an air and vacuum control valve co-axial with and intermediate said cylinder and power chamber engageable by said valve control piston for effecting said differential.

9. The combination, a hydraulic cylinder, valve control and fluid control pistons oppositely disposed therein providing a fluid chamber therebetween, there being a secondary fluid chamber in said cylinder for delivering fluid under pressure, a manually controlled pressure fluid source joining said first chamber, adapted for communication with said secondary chamber through said fluid control piston, and for operative pressure engagement with said valve control piston for effecting movement thereof, a power chamber, a movable member therein adapted to forceful translation, means carried by said movable member extending through said valve control piston to operatively engage said fluid control piston upon a pressure differential on opposite sides of said movable member, and an air and vacuum control valve intermediate said cylinder and movable member engageable by said valve control piston for effecting said differential.

10. The combination, a hydraulic cylinder, a valve housing co-axial with said cylinder and communicating with the interior thereof, movable air and vacuum control valve means within said housing, a valve control piston in said cylinder movable into operative contact with said movable valve means, a fluid control piston in said cylinder, a manually controlled pressure fluid source connected to the cylinder intermediate said pistons adapted for communication through said fluid control piston and for operative pressure engagement with said valve control piston, a plunger rod adapted for forceful translation extending through said valve control piston, a power chamber remote from said cylinder, a movable member therein adapted for a translation upon a pressure differential on opposite sides thereof, and pivotal motion transmitting means interconnecting said movable member and said plunger rod.

11. The combination, a hydraulic cylinder, an air and vacuum valve control piston and a brake fluid control piston in said cylinder, a manually controlled pressure fluid source connected to the cylinder intermediate said pistons adapted for communication through said fluid control piston and for operative pressure engagement with said valve control piston, a plunger rod provisioned through said valve piston for forceful longitudinal movement therein, a power chamber remote from said cylinder, a movable member therein defining an operating chamber and a vacuum chamber on opposite sides thereof, an air and vacuum control valve housing joining said cylinder and having air inlet ports therein, a vacuum source joining said vacuum chamber and said valve housing, an outlet connection on said housing in communication with said operating chamber, and movable means within said valve housing engageable by said valve control piston adapted to alternately provide air or vacuum communication through said outlet connection, and pivotal motion transmitting means interconnecting said power chamber movable member and said plunger rod.

12. The combination, a power chamber, a movable member therein defining an operating chamber and a vacuum chamber, a hydraulic cylinder containing a brake fluid control piston and a valve control piston, a manually controlled pressure fluid source connected to the cylinder intermediate said pistons adapted for communication through said fluid control piston and for operative pressure engagement with said valve control piston, a valve housing having air and vacuum inlet ports, and an outlet port communicating with said operating chamber, a hollow reciprocable valve member in said housing, a pair of hollow spaced diaphragms peripherally secured to said housing and centrally retained by said movable member providing therebetween a normally closed air passage between said air port and said outlet port, said valve control piston being normally spaced from one of said diaphragms and said hollow valve member providing a normally open vacuum passage between said vacuum port and said outlet port, whereby progressive movement in one direction of said valve control piston closes said vacuum passage and further movement thereof causes movement of said valve member to open said air passage, and partial movement of said valve piston in the opposite direction permits closing of said air passage, and further movement in the same direction opens said vacuum passage, whereby vacuum and air communication are alternately provided to said operating chamber, a vacuum source communicating with said vacuum chamber and with said vacuum inlet port, and a plunger rod secured to said power chamber movable member, slidably provisioned through said valve housing, said valve member, and through said valve operating piston, and adapted to forcefully engage said fluid control piston.

13. The combination, a hydraulic cylinder, a valve housing co-axial with said cylinder and communicating with the interior thereof, movable air and vacuum control valve means within said housing, a valve control piston in said cylinder movable into operative contact with said movable valve means, a fluid control piston in said cylinder, a manually controlled pressure fluid source connected to the cylinder intermediate said pistons adapted for communication through said fluid control piston and for operative pressure engagement with said valve control piston, a plunger rod adapted for forceful translation extending through said valve control piston and operative engagement with said fluid control piston, and pressure fluid motor means connected to said rod and controlled by said control valve to cause translation of said rod.

GORDON R. ELLIOTT.

REFERENCES CITED

The following references are of record in the file of this patent:

UNITED STATES PATENTS

| Number | Name | Date |
| --- | --- | --- |
| 1,840,882 | Bragg | Jan. 12, 1932 |
| 2,260,491 | Stelzer | Oct. 28, 1941 |
| 2,289,043 | Rockwell | July 7, 1942 |
| 2,308,460 | Stelzer | Jan. 12, 1943 |
| 2,322,063 | Schnell | June 15, 1943 |
| 2,336,374 | Stelzer | Dec. 7, 1943 |
| 2,352,357 | Almond | June 27, 1944 |
| 2,359,687 | Stelzer | Oct. 3, 1944 |